United States Patent
Baid et al.

(10) Patent No.: US 11,032,378 B2
(45) Date of Patent: Jun. 8, 2021

(54) DECOUPLED CONTROL AND DATA PLANE SYNCHRONIZATION FOR IPSEC GEOGRAPHIC REDUNDANCY

(71) Applicant: MICROSOFT TECHNOLGY LICENSING, LLC, Redmond, WA (US)

(72) Inventors: Akash Baid, Boston, MA (US); Vinay M. Cherian, Westford, MA (US); Mark Libby, Groton, MA (US); Nan Luo, Shrewsbury, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/994,224

(22) Filed: May 31, 2018

(65) Prior Publication Data

US 2018/0352036 A1    Dec. 6, 2018

Related U.S. Application Data

(60) Provisional application No. 62/512,895, filed on May 31, 2017.

(51) Int. Cl.
*H04L 29/08*    (2006.01)
*H04L 29/06*    (2006.01)
(Continued)

(52) U.S. Cl.
CPC .......... *H04L 67/145* (2013.01); *H04L 63/164* (2013.01); *H04L 69/40* (2013.01); *H04L 43/0811* (2013.01)

(58) Field of Classification Search
CPC ............. G06F 11/2048; G06F 11/1471; G06F 11/2028; G06F 11/2033; G06F 11/2025;
(Continued)

(56) References Cited

U.S. PATENT DOCUMENTS

| 7,346,840 B1 | 3/2008 | Ravishankar et al. |
| 7,466,694 B2 | 12/2008 | Xu et al. |

(Continued)

FOREIGN PATENT DOCUMENTS

| CN | 101093590 A | 12/2007 |
| CN | 102390184 A | 3/2012 |

(Continued)

OTHER PUBLICATIONS

US 10,505,788 B1, 12/2019, Mills et al. (withdrawn)
(Continued)

*Primary Examiner* — Tonia L Dollinger
*Assistant Examiner* — Linh T. Nguyen
(74) *Attorney, Agent, or Firm* — Ray Quinney & Nebeker, P.C.; Thomas M. Hardman; Sunah K. Lee

(57) ABSTRACT

Embodiments disclosed herein relate to systems and methods for separately managing control and data plan contexts for a secure connection during a standby node switchover scenario. Primary and standby nodes for a secure connection can both maintain a data plane context for a secure connection such as IPSec. In the event that the primary node becomes inactive, the standby node can immediately begin processing data plane traffic using the data plane context for the secure connection maintained at the standby node. Control plane information necessary for programming and activating a control plane context can be stored until needed. During a switchover, the standby node can retrieve the control plane information and activate the control plane context after it has begun processing the data plane traffic.

18 Claims, 5 Drawing Sheets

(51) Int. Cl.
*H04L 29/14* (2006.01)
*H04L 12/26* (2006.01)

(58) Field of Classification Search
CPC .... G06F 16/183; G06F 16/2365; G06F 16/27;
G06F 11/2023; G06F 11/2046; G06F
16/184; G06F 2201/815; G06F 11/2082;
G06F 2211/007; G06F 11/2007; H04L
63/029; H04L 67/1027; H04L 67/14;
H04L 12/4641; H04L 12/66; H04L
63/1408; H04L 9/3236; H04L 67/1002;
H04L 65/4084; H04L 67/101; H04L
67/1014; H04L 2209/56; H04L 63/045;
H04L 63/0815; H04L 9/14; H04L 9/3249;
H04L 9/3263; H04L 12/4633; H04L
9/0844; H04L 9/30; H04L 63/0457; H04L
9/0819; H04L 9/3242; H04L 63/0428;
H04L 63/0464; H04L 63/062; H04L
45/28; H04L 41/0663; H04L 41/0836;
H04L 45/04; H04L 45/00; H04L 45/60;
H04L 49/253; H04L 49/35; G06Q
20/3674; G06Q 20/382; G06Q 20/3829;
G06Q 20/40; H04W 12/0013; H04W
12/0017; H04W 76/12; H04W 76/15;
H04W 12/08
USPC ....... 709/203, 217, 219, 230, 237, 238, 212,
709/213; 726/12, 4, 5, 28, 29, 17;
370/216, 219, 220
See application file for complete search history.

(56) References Cited

U.S. PATENT DOCUMENTS

| | | | |
|---|---|---|---|
| 7,734,746 | B2 | 6/2010 | Ng et al. |
| 8,428,610 | B2 | 4/2013 | Chowdhury et al. |
| 8,477,730 | B2 | 7/2013 | Rajagopalan et al. |
| 8,509,200 | B2 | 8/2013 | Li et al. |
| 8,522,241 | B1 | 8/2013 | Vohra et al. |
| 8,565,070 | B2 | 10/2013 | Harper et al. |
| 8,787,875 | B2 | 7/2014 | Ahmed et al. |
| 8,855,051 | B2 | 10/2014 | Suh et al. |
| 8,995,262 | B2 | 3/2015 | Chowdhury et al. |
| 9,013,993 | B2 | 4/2015 | Logan et al. |
| 9,185,595 | B2 | 11/2015 | Qu |
| 9,294,981 | B2 | 3/2016 | Rajagopalan et al. |
| 9,300,623 | B1 | 3/2016 | Earl et al. |
| 9,578,541 | B2 | 2/2017 | Seenappa et al. |
| 9,985,875 | B1* | 5/2018 | Srinath et al. ........ H04L 12/703 |
| 10,484,844 | B2 | 11/2019 | Sudarsan et al. |
| 10,536,326 | B2 | 1/2020 | Mills et al. |
| 10,708,132 | B2* | 7/2020 | Gero ................. H04L 41/0816 |
| 2002/0007468 | A1 | 1/2002 | Kampe et al. |
| 2002/0023048 | A1 | 2/2002 | Buhannic et al. |
| 2002/0062388 | A1 | 5/2002 | Ogier et al. |
| 2003/0171114 | A1 | 9/2003 | Hastings |
| 2003/0187982 | A1 | 10/2003 | Petit |
| 2004/0131023 | A1 | 7/2004 | Auterinen |
| 2004/0181538 | A1 | 9/2004 | Lo et al. |
| 2004/0193763 | A1* | 9/2004 | Iizuka ................... G06F 13/385 710/52 |
| 2004/0267758 | A1 | 12/2004 | Katsurashima |
| 2005/0120240 | A1 | 6/2005 | Kiwimagi et al. |
| 2005/0136832 | A1 | 6/2005 | Spreizer |
| 2006/0008063 | A1 | 1/2006 | Harnesk et al. |
| 2006/0013191 | A1 | 1/2006 | Kavanagh |
| 2006/0114832 | A1 | 6/2006 | Hamilton et al. |
| 2006/0168655 | A1 | 7/2006 | Grandmaitre et al. |
| 2006/0195607 | A1 | 8/2006 | Naseh et al. |
| 2006/0288404 | A1 | 12/2006 | Kirshnan et al. |
| 2006/0294238 | A1 | 12/2006 | Naik et al. |
| 2007/0101377 | A1 | 5/2007 | Six et al. |
| 2007/0168058 | A1* | 7/2007 | Kephart ................. G05B 9/03 700/82 |
| 2007/0297400 | A1 | 12/2007 | Cameron et al. |
| 2008/0014961 | A1 | 1/2008 | Lipps et al. |
| 2008/0077465 | A1 | 3/2008 | Schimpf et al. |
| 2008/0162984 | A1* | 7/2008 | Kalra .................. H04L 41/0213 714/4.11 |
| 2008/0240082 | A1 | 10/2008 | Feldman et al. |
| 2009/0042537 | A1 | 2/2009 | Gelbman et al. |
| 2009/0109845 | A1 | 4/2009 | Andreasen et al. |
| 2009/0124284 | A1 | 5/2009 | Scherzer et al. |
| 2009/0300173 | A1 | 12/2009 | Bakman et al. |
| 2010/0035587 | A1 | 2/2010 | Bennett |
| 2010/0039932 | A1* | 2/2010 | Wen ..................... H04L 41/044 370/217 |
| 2010/0050172 | A1 | 2/2010 | Ferris |
| 2010/0066804 | A1 | 3/2010 | Shoemake et al. |
| 2010/0128708 | A1 | 5/2010 | Liu et al. |
| 2010/0188975 | A1 | 7/2010 | Raleigh |
| 2010/0238840 | A1 | 9/2010 | Lu et al. |
| 2010/0281151 | A1 | 11/2010 | Ramankutty et al. |
| 2010/0317331 | A1 | 12/2010 | Miller |
| 2011/0131338 | A1 | 6/2011 | Hu |
| 2011/0211583 | A1 | 9/2011 | Seetharaman et al. |
| 2011/0235505 | A1 | 9/2011 | Eswara et al. |
| 2011/0258433 | A1* | 10/2011 | Pulini .................... H04L 63/20 713/153 |
| 2011/0269499 | A1 | 11/2011 | Vikberg et al. |
| 2011/0296232 | A1* | 12/2011 | Izawa ..................... H04L 45/00 714/4.2 |
| 2011/0299386 | A1* | 12/2011 | Negoto .................. H04L 45/22 370/221 |
| 2012/0023360 | A1 | 1/2012 | Chang et al. |
| 2012/0030349 | A1 | 2/2012 | Sugai |
| 2012/0084449 | A1 | 4/2012 | Delos Reyes et al. |
| 2012/0106349 | A1 | 5/2012 | Adjakple et al. |
| 2012/0131647 | A1 | 5/2012 | Lan et al. |
| 2012/0143923 | A1 | 6/2012 | Whitney et al. |
| 2012/0144226 | A1 | 6/2012 | Yang et al. |
| 2012/0177005 | A1 | 7/2012 | Liang et al. |
| 2012/0190331 | A1 | 7/2012 | Ahmed et al. |
| 2012/0207104 | A1 | 8/2012 | Liang et al. |
| 2012/0236708 | A1 | 9/2012 | Kompella et al. |
| 2012/0282937 | A1 | 11/2012 | He et al. |
| 2013/0007286 | A1 | 1/2013 | Mehta et al. |
| 2013/0010756 | A1 | 1/2013 | Liang et al. |
| 2013/0054789 | A1 | 2/2013 | Bajamahal |
| 2013/0094395 | A1 | 4/2013 | Lopez et al. |
| 2013/0100815 | A1 | 4/2013 | Kakadia et al. |
| 2013/0121298 | A1 | 5/2013 | Rune et al. |
| 2013/0173804 | A1 | 7/2013 | Murthy et al. |
| 2013/0188555 | A1 | 7/2013 | Olsson et al. |
| 2013/0212205 | A1* | 8/2013 | Flockhart et al. ....... G06F 15/16 709/208 |
| 2013/0215769 | A1* | 8/2013 | Beheshti-Zavareh ........ H04W 16/18 370/252 |
| 2013/0231080 | A1 | 9/2013 | Cheuk et al. |
| 2013/0286821 | A1 | 10/2013 | Liu |
| 2013/0308604 | A1 | 11/2013 | Jiang et al. |
| 2013/0339783 | A1* | 12/2013 | Fernandez Alonso ........ H04L 41/0668 714/4.11 |
| 2014/0047282 | A1 | 2/2014 | Deb et al. |
| 2014/0098671 | A1 | 4/2014 | Raleigh et al. |
| 2014/0133464 | A1 | 5/2014 | Li et al. |
| 2014/0148165 | A1 | 5/2014 | Serravalle et al. |
| 2014/0160938 | A1 | 6/2014 | Qu |
| 2014/0221025 | A1 | 8/2014 | Chandramouli et al. |
| 2014/0241174 | A1 | 8/2014 | Harris et al. |
| 2014/0359041 | A1 | 12/2014 | Bai |
| 2015/0018131 | A1 | 1/2015 | Siefker |
| 2015/0050924 | A1 | 2/2015 | Gotou |
| 2015/0181431 | A1 | 6/2015 | Zheng et al. |
| 2015/0201364 | A1 | 7/2015 | Yamada et al. |
| 2015/0215768 | A1 | 7/2015 | Dong et al. |
| 2015/0237539 | A1 | 8/2015 | Guo |
| 2015/0271255 | A1 | 9/2015 | Mackay et al. |

(56) References Cited

U.S. PATENT DOCUMENTS

| | | | |
|---|---|---|---|
| 2015/0280927 A1 | 10/2015 | Liang et al. | |
| 2015/0334615 A1 | 11/2015 | Zhang et al. | |
| 2015/0363423 A1* | 12/2015 | Utgikar | H04L 67/322 |
| | | | 707/827 |
| 2016/0028607 A1 | 1/2016 | Weill et al. | |
| 2016/0029278 A1 | 1/2016 | Poikonen et al. | |
| 2016/0135143 A1 | 5/2016 | Won et al. | |
| 2016/0270142 A1 | 9/2016 | Olsson et al. | |
| 2016/0285923 A1* | 9/2016 | Kodaypak | H04L 65/1069 |
| 2016/0286385 A1 | 9/2016 | Ryu et al. | |
| 2016/0337841 A1 | 11/2016 | Won et al. | |
| 2016/0353325 A1 | 12/2016 | Poikonen | |
| 2017/0118067 A1* | 4/2017 | Vedula | H04L 61/103 |
| 2017/0127324 A1 | 5/2017 | Liang et al. | |
| 2017/0142762 A1 | 5/2017 | Kedalagudde et al. | |
| 2017/0257810 A1* | 9/2017 | Gandhi | H04W 4/06 |
| 2017/0331725 A1* | 11/2017 | Rosenberry | H04L 45/64 |
| 2018/0049156 A1 | 2/2018 | Laha et al. | |
| 2018/0077714 A1 | 3/2018 | Kodaypak et al. | |
| 2018/0139797 A1 | 5/2018 | Chun et al. | |
| 2018/0176073 A1* | 6/2018 | Dubey | H04L 41/0672 |
| 2018/0192234 A1 | 7/2018 | Mohamed et al. | |
| 2018/0248711 A1 | 8/2018 | McCann | |
| 2018/0270710 A1 | 9/2018 | Hua et al. | |
| 2018/0279115 A1 | 9/2018 | Tanna | |
| 2018/0332636 A1 | 11/2018 | Lu et al. | |
| 2018/0343601 A1 | 11/2018 | Livanos | |
| 2018/0368202 A1 | 12/2018 | Landais et al. | |
| 2019/0028866 A1 | 1/2019 | Baek et al. | |
| 2019/0037441 A1 | 1/2019 | Liu et al. | |
| 2019/0313216 A1 | 10/2019 | Wong et al. | |
| 2020/0028896 A1 | 1/2020 | Veldanda et al. | |

FOREIGN PATENT DOCUMENTS

| | | |
|---|---|---|
| CN | 102555536 A | 7/2012 |
| CN | 202965525 U | 6/2013 |
| CN | 103404181 A | 11/2013 |
| CN | 203311505 U | 11/2013 |
| CN | 104363572 A | 2/2015 |
| CN | 103348335 B | 7/2016 |
| EP | 1011974 A1 | 6/2000 |
| EP | 1518352 A1 | 8/2007 |
| EP | 1518352 B1 | 8/2007 |
| EP | 2200369 A2 | 6/2010 |
| EP | 2709385 A1 | 3/2014 |
| GB | 2409368 A | 6/2005 |
| JP | 2002-319963 A | 10/2002 |
| JP | 2006-501781 A | 1/2006 |
| JP | 2009-522933 A | 6/2009 |
| JP | 2010-088013 | 4/2010 |
| JP | 2010-141555 A | 6/2010 |
| JP | 2011-508474 A | 3/2011 |
| JP | 2011-259440 A | 12/2011 |
| KR | 10-2010-0070691 A | 6/2010 |
| WO | WO-2004004216 A1 | 1/2004 |
| WO | WO-2007081727 A2 | 7/2007 |
| WO | WO-2009107117 A2 | 9/2009 |
| WO | WO-2010066430 A1 | 6/2010 |
| WO | WO-2013143831 A1 | 10/2013 |
| WO | WO-2013177693 | 12/2013 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |
| WO | WO-2018222838 | 12/2018 |
| WO | WO-2020023511 A1 | 1/2020 |

OTHER PUBLICATIONS

3GPP TR 23.714 V.14.0.0 (Jun. 2016), "3rd Generation Partnership Project; Techincal Specification Group Services and System Aspects; Study on control and user plane separation of EPC nodes (Release 14)"; Valbonne, France, Jun. 2016 (87 pages).

3GPP TS 23.040 v13.2.0 (Sep. 2016), "3rd Generation Partnership Project; Technical Specification Group Core Network and Terminals; Technical realization of the Short Message Service (SMS) (Release 13)", Valbonne, France, Sep. 2016 (214 pages).

3GPP TS 23.204 v13.1.0 (Jun. 2016), "3rd Generation Partnership Project; Technical Specification Group Services and Systems Aspects; Support of Short Message Service (SMS) over generic 3GPP Internet Protocol (IP) access; Stage 2 (Release 13)", Valbonne, France, Jun. 2016 (59 pages).

3GPP TS 23.214 V14.5.0 (Dec. 2017), "3rd Generation Partnership Project; Techincal Specification Group Services and System Aspects; Architecture enhancements for control and user plane separation of EPC nodes; Stage 2 (Release 14)", Valbonne, France, Dec. 2017 (84 pages).

3GPP TS 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", Valbonne, France, Jun. 2013 (40 pages).

3GPP TS 23.236 v13.0.0 (Jun. 2015); "3rd Generation Partnership Project; Technical Specification Group Services and System Aspects; Intra-domain connection of Radio Access Network (RAN) nodes to multiple Core Network (CN) nodes (Release 13)", Valbonne, France, Jun. 2015 (41 pages).

3GPP TS 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).

3GPP TS 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).

3GPP TS 29.128 v13.3.0 (Dec. 2016), "3rd Generation Partnership Project; Technical Specification Group Core Network and Terminals; Mobility Management Entity (MME) and Serving GPRS Support Node (SGSN) interfaces for interworking with packet data networks and applications (Release 13)", Valbonne, France, Dec. 2016 (47 pages).

3GPP TS 29.338 v13.3.0 (Dec. 2016), "3rd Generation Partnership Project; Technical Specification Group Core Network and Terminals; Diameter based protocols to support Short Message Service (SMS) capable Mobile Management Entities (MMEs) (Release 13)", Valbonne, France, Dec. 2016 (50 pages).

3GPP ETSI TS 125 401 v12.0.0 (Oct. 2014), "Universal Mobile Telecommunications System (UMTS); UTRAN overall description (3GPP TS 25.401 version 12.0.0 Release 12)", Cedex, France, Oct. 2014 (65 pages).

Extended European Search Report issued by the European Patent Office for European Patent Application No. 12825827.4 dated Mar. 6, 2015 (7 pages).

Extended European Search Report issued in European Patent Application No. 16762501.1, dated Oct. 30, 2018 (11 pages).

Giust, F. et al., "ETSI: MEC Deployments in 4G and Evolution Towards 5G", ETSI White Paper No. 24, First Edition, ISBN No. 979-10-92620-18-4, Feb. 2018 (24 pages).

Horak, R., Excerpt from "Internet Protocols", in Telecommunications and Data Communications Handbook, John Wiley & Sons, pp. 663-664, Aug. 2007 (2 pages).

International Search Report and Written Opinion issued by the U.S. Patent and Trademark Office as International Searching Authority for International Application No. PCT/US12/21520 dated May 8, 2012 (8 pages).

International Search Report and Written Opinion issued by the U.S. Patent and Trademark Office as International Searching Authority for International Patent Application No. PCT/US16/21744 dated Jun. 9, 2016 (8 pages).

(56) References Cited

OTHER PUBLICATIONS

International Search Report and Written Opinion issued by the U.S. Patent and Trademark Office as International Searching Authority received for International Patent Application No. PCT/US12/25577, dated May 21, 2012 (7 pages).
International Search Report and Written Report issued by the U.S. Patent and Trademark Office as International Searching Authority, issued in PCT/US17/017913, dated Mar. 13, 2017 (14 pages).
Rodriguez, et al., "A 3GPP System Architecture Evolution Virtualized Experimentation Infrastructure for Mobility Prototyping (Invited Paper)", Tridentcom 2008, Innsbruck, Austria, Mar. 18, 2008 (10 pages).
Taniguchi, et al., "Implementation and Evaluation of Cooperative Proxy Caching System for Video Streaming Services", Technical Report of the Institute of Electronics, Information and Communication Engineers, IEICE, Japan, vol. 103(650):13-18, Feb. 5, 2004—English Abstract (6 pages).
3GPP TR 23.722 v0.1.1, "3rd Generation Partnership Project; Technical Specification Group Services and System Aspects; Study on Common API Framework for 3GPP Northbound APIs (Release 15)", Valbonne, France, Apr. 2017 (20 pages).
3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).
Cisco Systems, "Deployment Guide: Cisco IOS IPSEC High Availability", 2005, accessed http://www.cisco.com/en/US/technologies/tk583/tk372/technologies_white_paper0900aecd80278edf.pdf, retrieved Jul. 26, 2018 (16 pages).
International Search Report and Written Opinion issued by the European Patent Office as International Searching Authority in International Application No. PCT/US2018/035345, dated Aug. 13, 2018 (19 pages).
International Search Report and Written Opinion issued by the European Patent Office as International Searching Authority in International Application No. PCT/US2018/031423, dated Oct. 9, 2018 (18 pages).
Hakala, H. et al., "Diameter Credit-Control Application, RFC 4006", Network Working Group, Standards Track, http://tools.ietf.org/html/rfc4006, pp. 1-11, 55-57, 69, 71-75, Aug. 2005 (20 pages).
3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).
3GPP TR 21.905 v15.0.0 (Mar. 2018), 3rd Generation Partnership Project; Technical Specification Group Services and System Aspects; Vocabulary for 3GPP Specifications (Release 15), Valbonne, France, Mar. 2018 (65 pages).
3GPP TS 23.682 v. 15.5.0 (Jun. 2018),"3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).
3GPP TS 23.682 v.13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).
International Search Report and Written Opinion issued by the U.S. Patent and Trademark Office as Searching Authority, issued in International Application PCT/US16/69092, dated Mar. 29, 2017 (15 pages).
3GPP TS 23.401v13.5.0 (Dec. 2015), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne France, Dec. 2015 (337 pages).
Apple, 3GPP Draft, "A solution of network slice instance selection and association", Temporary Document, SA WG2 Meeting #S2-116BIS, S2-165127, Aug. 29-Sep. 2, 2016, Sanya, P.R China, Sep. 2016 (5 pages).
European Extended Search Report issued in EP16882635.2. dated Jul. 17, 2019 (13 pages).
International Search Report and Written Opinion issued by the European Patent Office as International Searching Authority in International Application No. PCT/US2019/018666, dated Jul. 10, 2019 (26 pages).
International Search Report and Written Opinion issued by the European Patent Office as International Searching Authority, issued in International Application No. PCT/US19/23138, dated May 29, 2019 (16 pages).
International Search Report and Written Opinion as issued by the U.S. Patent and Trademark office as International Search authority, received for PCT Patent Application No. PCT/US2011/055183, dated Mar. 8, 2012, 9 pages.
International Search Report and Written Opinion issued by the European Patent Office as International Searching Authority for International Application No. PCT/US19/43037, dated Oct. 29, 2019 (14 pages).

* cited by examiner

DECOUPLED CONTROL AND DATA PLANE SYNCHRONIZATION FOR IPSEC GEOGRAPHIC REDUNDANCY

CROSS-REFERENCE TO RELATED APPLICATIONS

This application claims the benefit under 35 U.S.C. § 119(e) to U.S. Provisional Patent Application No. 62/512,895 entitled "DECOUPLED CONTROL AND DATA PLANE SYNCHRONIZATION FOR IPSEC GEOGRAPHIC REDUNDANCY," filed on May 31, 2017, the content of which is incorporated by reference herein.

TECHNICAL FIELD

The present disclosure relates to systems and methods for controlling control plane and data plane traffic in a mobile network, and in particular systems and methods for decoupling control and data plane synchronization for Internet Protocol Security (IPsec) geographic redundancy.

BACKGROUND

Stateful geographic redundancy for network elements such as VPN gateways and ePDG, that terminate IPsec tunnels, requires synchronization of a large amount of long-lasting, per-tunnel state information between the active and standby nodes. During a network anomaly, for example, an active node may fail and the state of the user's session must be recovered at a standby node, which switches to an active role. When the standby node switches to an active role, it needs to program and activate various control and data-path functionalities as quickly as possible. For a security gateway with large number of active tunnels, this programming phase can be inefficient and can take several seconds, leading to extended packet losses from which applications might not be able to recover. In some existing recovery solutions, standby nodes may store both control plane and data plane information. During a network anomaly, both control plane and data plane functionality must be programmed and activated, leading to long recovery times. On the other hand, maintaining "live" session information for both control plane and plane at a standby node is resource intensive for processors and memory. Other recovery solutions employ a prioritization scheme that may recover certain prioritized sessions before recovering other, lower priority sessions, thus minimizing the impact of long recovery times. IPsec state synchronization techniques that are explicitly designed for and take advantage of cloud-native or control/data plane separation architectures to improve efficient recovery and minimize interruptions to user plane activity are lacking.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
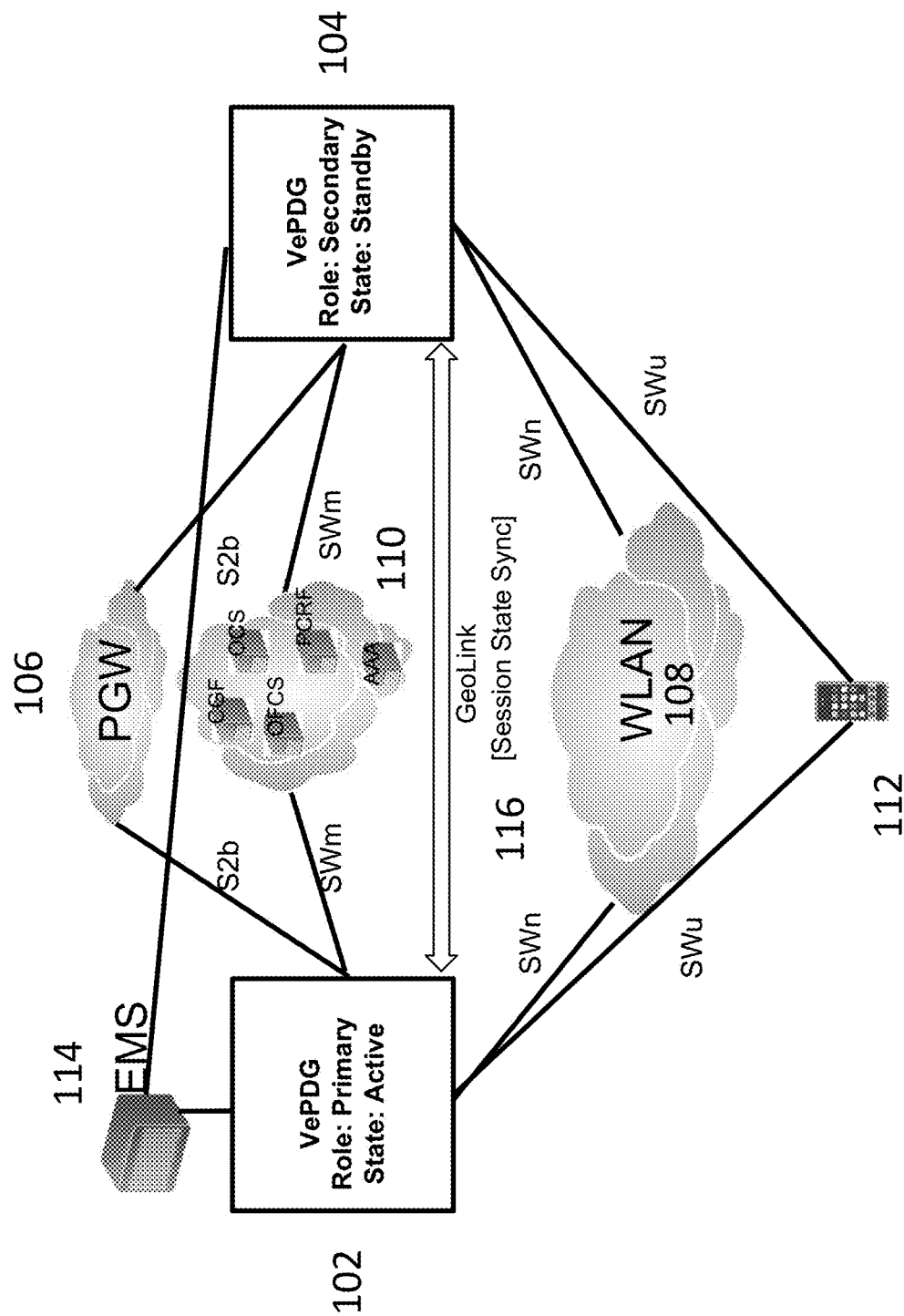
FIG. 1 is a system diagram showing a geo-redundant networked system, according to some embodiments.

The present disclosure describes systems and methods for explicitly decoupling control-plane state synchronization from data-plane state synchronization. A subset of the state parameters synchronized between active and standby nodes are essential for data-path packet processing functions, i.e. encryption and decryption of packets, whereas the remainder of the state parameters are needed for control-plane functions such as rekeying of phase-1 and phase-2 tunnels, dead-peer detection, SPI assignment, Mobility and Multi-homing Protocol ("MOBIKE") support, etc. As tunnels are added on the active node, both data-plane and control-plane state information related to the tunnels can be synchronized to their respective standby locations in the network. Standby nodes will receive information related to the active tunnel control plane and active data plane from the active node. This information can be used by the standby node to replicate the tunnel that is at the active node. In some embodiments (e.g. cloud native applications), the control plane data can be stored in an external database.

In some embodiments only the data-plane component is programmed so that it can start processing packets as soon as a switchover is triggered. The information necessary to program and activate the control plane component is stored until the switchover is triggered. Programming can mean establishing a data channel that is immediately capable of processing data even though the data channel may not necessarily be actively processing data yet. Once the data-plane component is programmed at the standby node, the standby node is ready to process data associated with the active tunnel in the event the active node becomes unavailable.

In some embodiments, a switchover can be triggered by a network-anomaly. For example, a standby node can detect that the active node is no longer active by monitoring interfaces (e.g. BGP peering interfaces) connected to the standby node. The standby node can infer that the active node is no longer active based on the communication link with the active node. For example, if the activity on the link indicates that the active node is inactive, the standby node can infer that a network anomaly has occurred and begin the switchover process. The standby node can also detect that the active node is no longer active if it receives traffic that would otherwise be handled by the primary node. In some embodiments, the standby node can detect that the primary node is inactive by monitoring route weights managed by decentralized route optimization techniques. For example, an active primary node may report that its route cost is 5, while a standby node may report that its route cost is 10. In this first state, traffic is routed through the active primary node because its route cost is lower than the standby node. If the primary node is no longer active, its route cost may become 100. In this scenario, the standby node becomes the preferred route because its route cost is lower. In some embodiments, a switchover can be manually triggered (e.g. by direct communication via the EMS). After a switchover is triggered, the control-plane state can then be retrieved from the database and programmed on the standby control-node. Since the data-plane component was already programmed, data-packet processing can begin immediately and is not be delayed by the amount of time need to restore the control plane component. That is, control plane resources can be recovered at the standby node after the standby node begins processing data packets over the data-plane. Control plane information (e.g. encryption keys, transforms, and other information on how to decrypt control packets) may be compressed and/or stored during the standby state which also prevents control-plane resources from being wasted due to allocation and blocking before they are really used.

Also, as described in more detail below, the decoupled synchronization described herein fits naturally in a control/data plane split architecture where there might be one or more control plane nodes separate from one or more data-plane nodes. In such an architecture, all the standby data-plane nodes can always be kept ready by programming them with the cryptographic keys needed for IPsec operation. Thus, the switchover time is only limited by the routing convergence time as all elements of the distributed data plane would be ready to process the incoming IPsec packets. In addition, the stack and resources (e.g. storage and processing resources) on the control-plane node(s) can be engaged only when they are actually needed. The state information can be stored until then in a database. In some embodiments, the state information can, be stored on an external database.

One advantage of a decoupled synchronization approach is that it can naturally fit and scale to the needs of a control-plane/user-plane split architecture. In some embodiments, the separation of control plane and data plane information allows one control plane to be associated with more than one data plane. In deployments with one control-plane element and several data-plane elements, only data-plane state needs to be synchronized to the data-plane elements. In addition, since data-plane state and control-plane state is needed at different points of time during a network-anomaly triggered switchover between standby to active roles, resources can be conserved, and session restoration time can be improved. The control-plane state can be stored in an external database until the state is actually needed. In some embodiments, the control plane information is stored in a common database that is accessible to both the primary and standby nodes. In this example, the primary node may store the control plane information at the common database. In a switchover scenario, the standby database can retrieve the control plane information that was previously stored by the primary node in the common database. In another embodiment, the standby node is configured to receive the control plane information from the primary node and can store it either locally or in an external database. The external database may be any database that is accessible to the standby node.

FIG. 1 is a system diagram showing a geo-redundant networked system, according to some embodiments. In this example, a secure connection is being established between network nodes (VePDG 102 and VePDG 104) and a user over an untrusted WiFi network (WLAN 108). The secure connection is used to bridge a connection over the untrusted connection with WLAN 108. The geo-redundant networked system includes primary virtualized Evolved Packet Data Gateway (VePDG) 102, standby VePDG 104, packet data network gateway (PGW) 106, wireless local area network (WLAN) 108, other mobile network modules 110, mobile device 112, element management system (EMS) 114, and geolink 116. It should be understood that the example illustrated in FIG. 1 using VePDG nodes is non-limiting. This system can also be implemented in any other system node that provides an IPSec connection or similar secure connection. For example, the primary and standby nodes can be VPN or enterprise VPN nodes that provide VPN functionality over IPsec tunnels. It should also be understood that the methods and systems described herein may apply to future generations of communications networks. For example, the methods and systems described herein can be applied to 5G cellular networks. In one such embodiment, the primary and standby nodes can comprise N3IWF nodes.

VePDG 102 is a gateway for voice and data traffic using untrusted (e.g. unencrypted) access (e.g. open WiFi or the equivalent). VePDG 102 connects to a mobile device 112 via SWu, which is a logical interface toward user equipment (UE). VePDG 102 communicates with an access network (e.g., WLAN 108) through SWn. VePDG 102 is the primary node and remains active until such time its responsibilities need to be transferred to a backup node. This transfer can result from a failure or other error associated with VePDG 102. It can also occur as the result of an instruction from an operator or the EMS 114. VePDG 102 can track states of both the control plane and the data plane.

VePDG 104 is a gateway for voice and data traffic using untrusted (e.g. unencrypted) access (e.g. open WiFi or the equivalent). VePDG 104 connects to a mobile device 112 via SWu, which is a logical interface toward user equipment (UE). VePDG 104 communicates with an access network (e.g., WLAN 108) through SWn. VePDG 104 is a secondary node and remains in standby until such time it needs to take over the responsibilities of an active node. This transfer can result from a failure or other error associated with a primary node. It can also occur as the result of an instruction from an operator or the EMS 114. VePDG 104 can track states of both the control plane and the data plane.

In some embodiments, the states are associated per-geo node. They are effectively "active" (e.g., the node owns the current control and data plane user sessions) or "standby" (e.g., the node is told the current control and data plane sessions). The transition between states according to some embodiments is shown and described in FIG. 4 and its accompanying text.

VePDG 102 and VePDG 104 can also communicate with PGW 106 via S2b, which is an interface toward PGW.

VePDG 102 and VePDG 104 can also communicate with other mobile network modules 110 via SWm, which is an interface toward 3GPP AAA server. Other mobile network modules can include a Charging Function (CGF)/Online Charging System (OCS)/Offline Charging System (OFCS) (for charging), a Policy and Charging Rules Function (PCRF) (for policy), and a Diameter Routing Agent (DRA) or Authentication, Authorization and Accounting (AAA) (for user authentication).

EMS 114 can be used to guarantee configuration consistency between the geo-graphically separate nodes. In some embodiments, this assures that the standby geo-node has all of the network connectivity and configuration necessary to take over the control and data plane sessions from the active geo-node. For example, network connectivity and configuration can include details about hostname, IP addresses, port numbers, and name spaces of local entities as well as external servers. In some embodiments, the consistency can be guaranteed by the operator via other mechanisms. For example, an operator can manually log in to the command line interface of the active and standby nodes to configure them identically.

Geolink 116 is a communication protocol between VePDG 102 and VePDG 104 to transfer and to synchronize state information. In some embodiments, Geolink 116 can comprise a proprietary communication protocol that simulates a replicated database. For example, the Geolink 116 can be implemented using a proprietary messaging mechanism that communicates information from one process to one or more processes. For example, the messaging mechanism can use a separate channel for each unique category of information. In an IPSec connection, two separate channels can be used to communicate information from an active geo-node to a standby geo-node: one for control plane information and one for data plane information.

Figure 2:
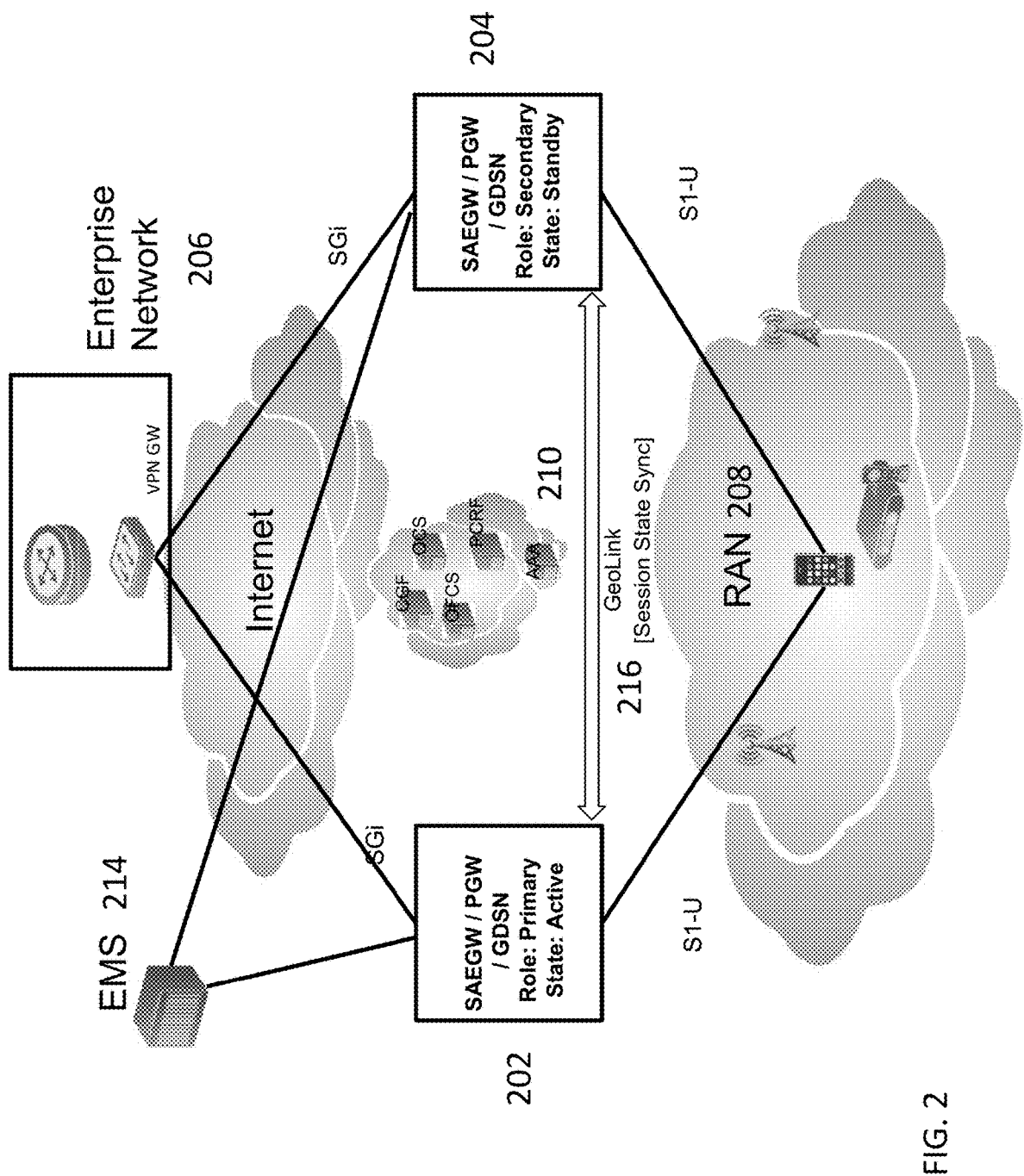
FIG. 2 is a system diagram showing a geo-redundant networked system, according to some embodiments.

FIG. 2 is a system diagram showing a geo-redundant networked system, according to some embodiments. In this example, a secure connection is established between the network nodes (primary and standby) and an enterprise network that is accessible over the Internet. Since the Internet connection may be insecure, the secure connection is used to bridge the untrusted connection over the Internet. The geo-redundant networked system includes primary node 202, standby node 204, Enterprise Network 206, Radio Access Network (RAN) 208, other mobile network modules 210, mobile device 212, element management system (EMS) 214, and geolink 216. The RAN 208 could be any other access network. For example, RAN 208 could also be a WLAN connection. Primary node 202 and Standby node 204 can be any of an SAEGW, PGW, GDSN, or similar network node.

Primary node 202 is a gateway for communicating (via e.g. an SGi interface) with an enterprise network that is accessible over the Internet. Primary node 102 connects to a mobile device 212 via S1-U, which is a logical interface toward user equipment (UE). Primary node 202 also communicates with an access network (e.g., RAN 208) S1-U. Primary node 202 remains active until such time its responsibilities need to be transferred to a backup or standby node. This transfer can result from a failure or other error associated with primary node 202. Primary node 202 can track states of both the control plane and the data plane.

Standby node 204 is a gateway for communicating (via e.g. an SGi interface) with an enterprise network that is accessible over the Internet. Standby node 104 connects to a mobile device 212 via S1-U, which is a logical interface toward user equipment (UE). Standby node 204 communicates with an access network (e.g., RAN 208) through S1-U. Standby node 104 is a secondary node and remains in standby until such time it needs to take over the responsibilities of an active node. This transfer can result from a failure or other error associated with a primary node. Standby node 104 can track states of both the control plane and the data plane. Primary node 102 and Standby node 104 can also communicate with an Enterprise Network 206 via SGi, which is an interface toward the Enterprise Network.

Figure 3:
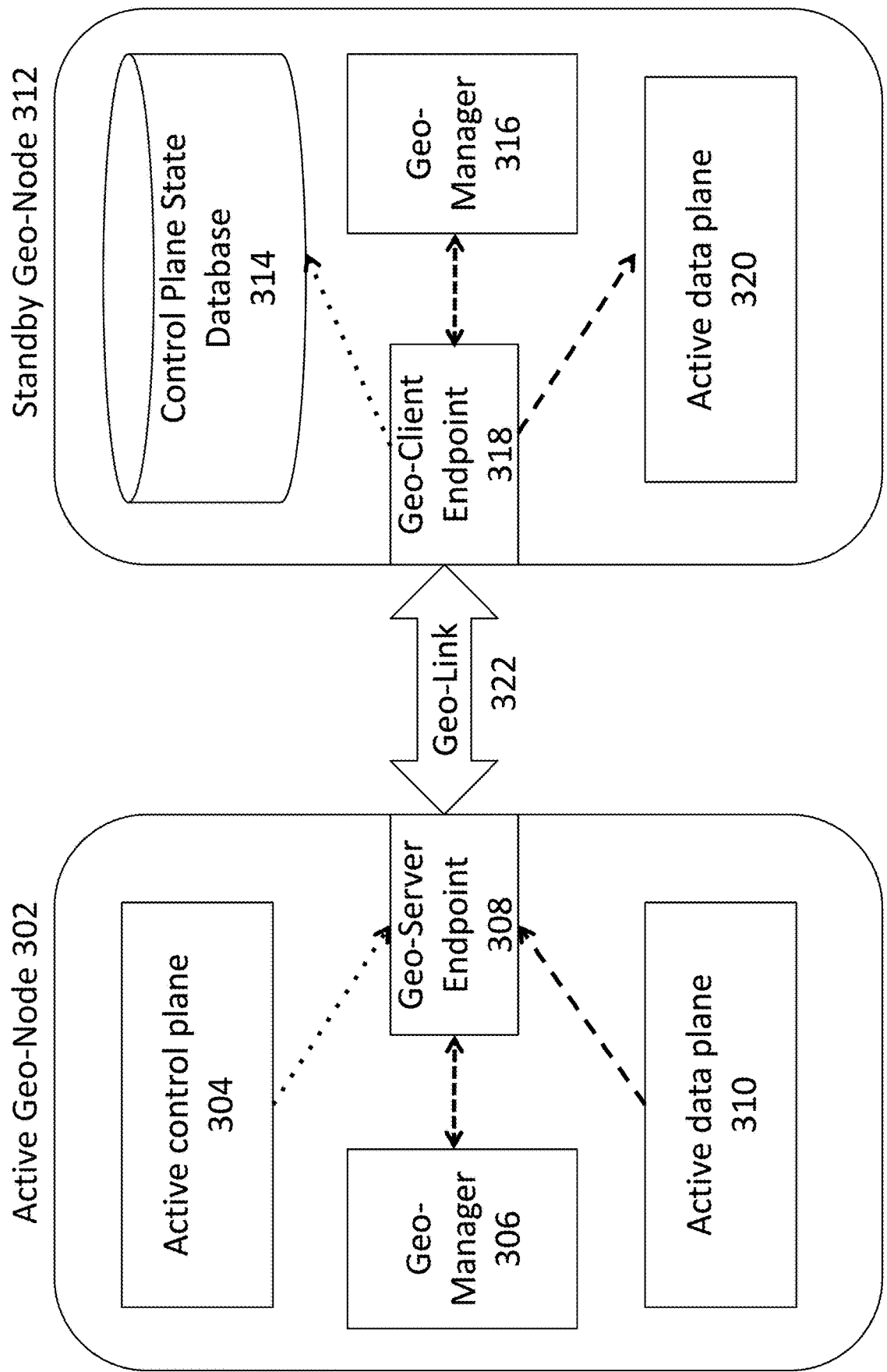
FIG. 3 is a diagram showing an active geo-node and a standby geo-node, according to some embodiments.

FIG. 3 is a diagram showing an active geo-node and a standby geo-node, according to some embodiments. In some embodiments, the active geo-node 302 can correspond to VePDG 102 and the standby geo-node 312 can correspond to VePDG 104. In other embodiments, active geo-node 302 and standby geo-node 312 can correspond to primary node 202 and standby node 204, respectively.

The active geo-node 302 includes an active control plane 304 and active data plane 310. The active geo-node 302 communicates with standby geo-node 312 via a pathway defined by geo-server endpoint 308, geo-link 322, and geo-client endpoint 318. Information sent over the pathway includes geo-redundancy control information (between geo-redundancy managers), user control data (from active database on active geo-node to standby database on standby geo-node), and user data plane state (from active database on active geo-node to active database on standby geo-node). The standby geo-node 312 may store any user control data received from the active geo-node 302 in control plane state database 314. In some embodiments (not shown), control plane database may be external to the standby geo-node 312.

Figure 4:
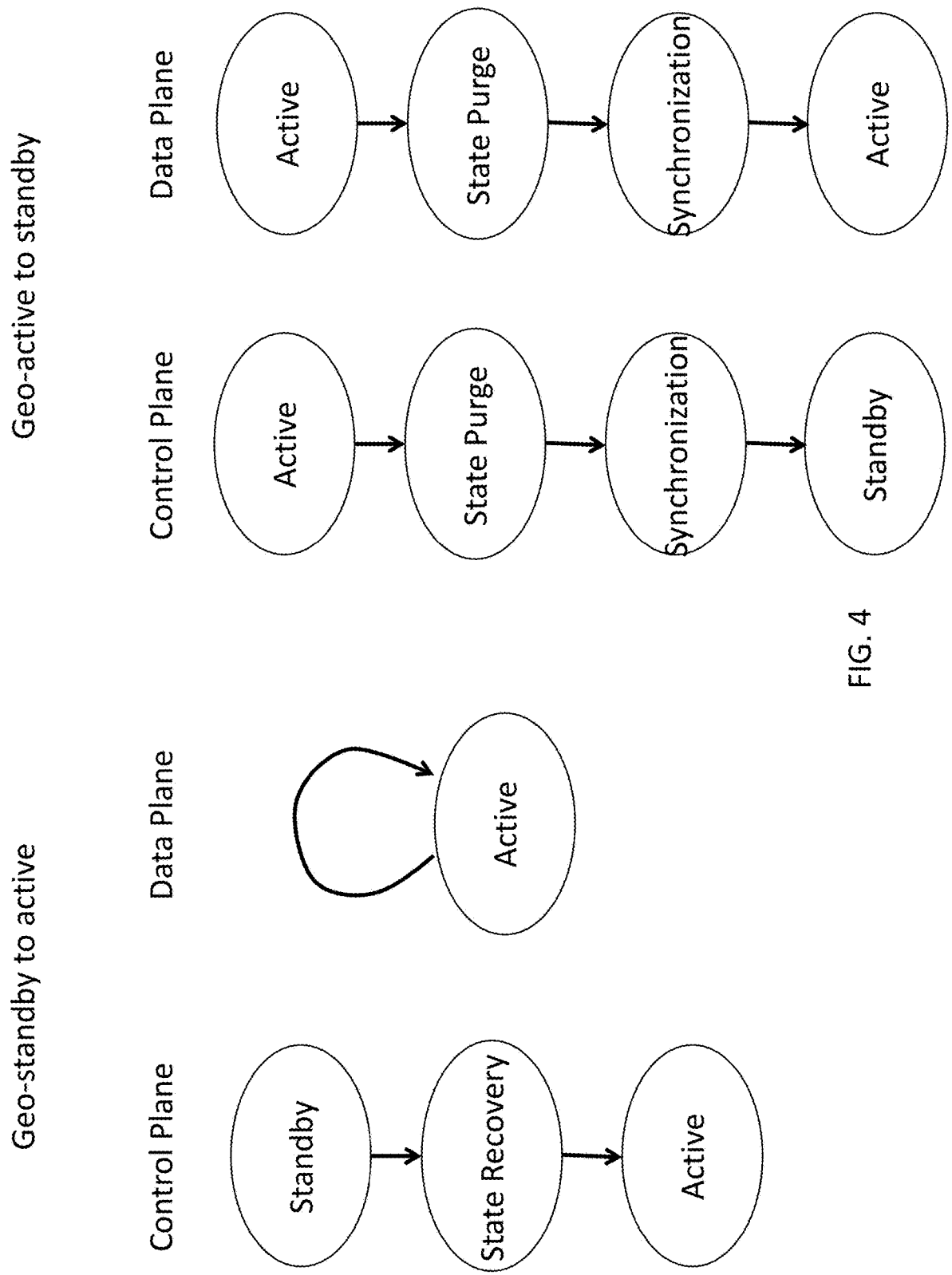
FIG. 4 is a flowchart showing a transition between active and standby states, according to some embodiments.

FIG. 4 is a flowchart showing a transition between active and standby states, according to some embodiments.

From a transitional perspective, the data planes on both the active and standby geo-nodes are both actually active from an operational perspective. In other words, the standby geo-node is as capable of handling user data as the active geo-node. In some embodiments, this is referred to as hot-staging of data resources. The control plane, on the other hand, transitions from "standby" to "state recovery", and then from "state recovery" to "active". During the transitions, control plane interruptions may occur. Not until the state is active does full control plane functionality recover.

Geo Node: Standby→active

Data plane: No transition

Control plane: Standby→state recovery→active

In some embodiments, when a node transitions from active to standby, user data is purged and starts fresh again (as if the standby geo-node were coming up for the first time). The old data is purged and then is synchronized with the active geo-redundant node to recover the current state data. Note that the data plane transitions to active (e.g., ready to handle data) while the control plane is in standby (e.g., control data is in a database).

Geo Node: Active→standby

Data plane: active→state purge→synchronization→active

Control plane: active→state purge→synchronization→standby

Figure 5:
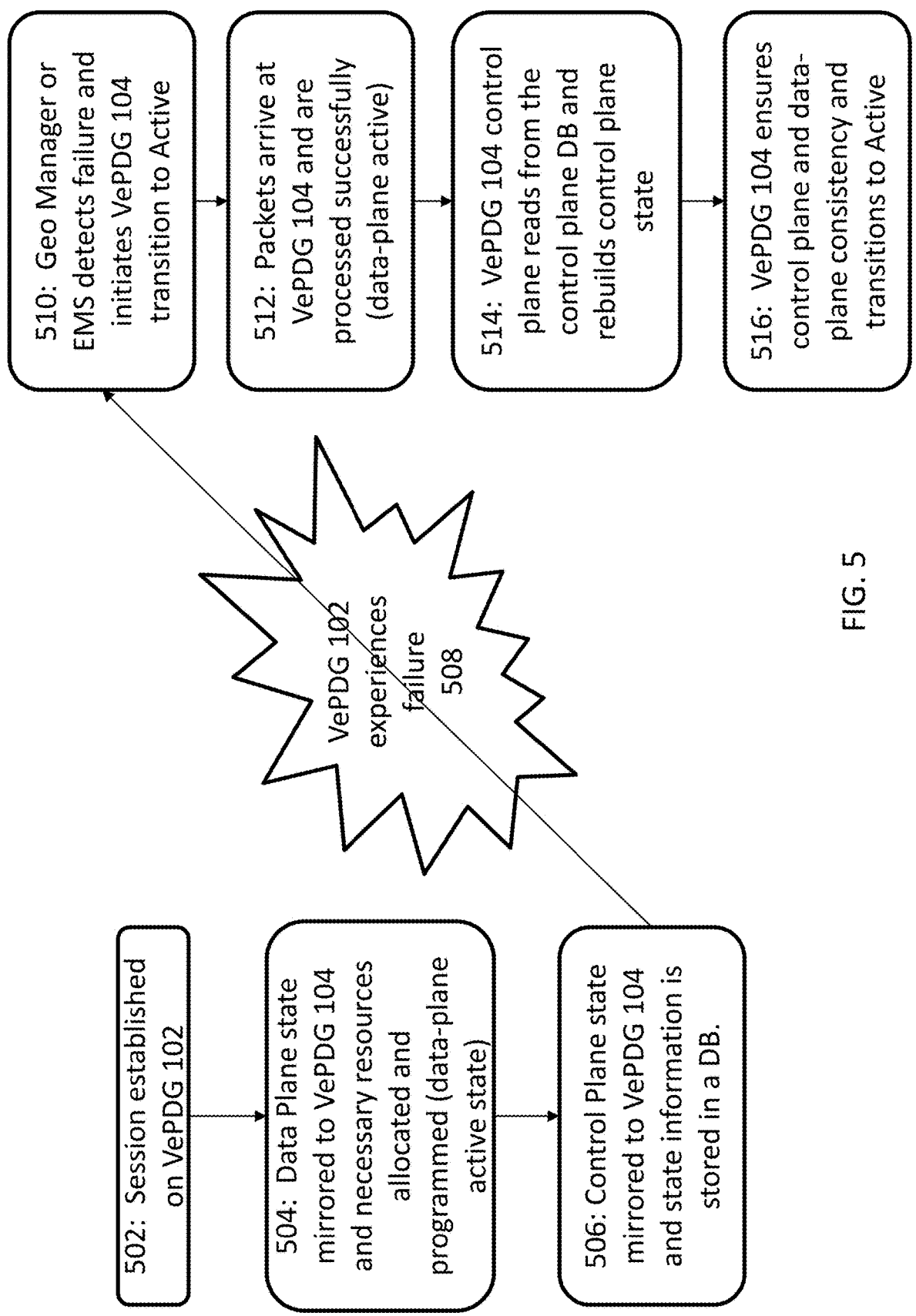
FIG. 5 is a flowchart showing data plane and control plane state replication and switchover, according to some embodiments.

FIG. 5 is a flowchart showing data plane and control plane state replication and switchover, according to some embodiments.

Referring to step 502, a session is established on VePDG 102. Referring to step 504, data plane state is mirrored to VePDG 104 and necessary resources allocated and programmed (e.g., data-plane active state). For example, the resources include parameters such as IP address, Security Policy Indexes (SPIs), encryption and decryption algorithms and negotiated encryption and decryption keys for each IPsec session. In some embodiments, this process is repeated at a set time interval or upon receiving instruction to repeat the process.

Referring to step 506, control plane state is sent to VePDG 104 and state information is stored in a database. In some embodiments, this process is repeated at a set time interval or upon receiving instruction to repeat the process. Referring to step 508, VePDG 102 experiences failure. Referring to step 510, Geo Manager or EMS detects failure and initiates VePDG 104 transition to active. In some embodiments, this transition to active occurs as soon as possible after the failure. In some embodiments, the transition duration depends on multiple factors (e.g., error detection, fault propagation), and in some embodiments is measured in seconds. Referring to step 512, after VePDG 104 has been transitioned to active, packets arrive at VePDG 104 and are processed successfully (e.g., data-plane active).

Referring to step 514, VePDG 104 control plane reads from the control plane database and rebuilds control plane state. From the control plane database, information about each IKE SA (security association) and IPSEC SA can be gathered. Information gathered can include remote IP address, SPIs used, encryption algorithms, time of last rekey, message sequence numbers, etc. Associations between IKE and IPSEC SA can also be built at this time. Rule lookup data-structures are also built at this time which can be very CPU intensive for a large number of tunnels. Note that no data-plane activity is required during this process and data flow is not interrupted. The control-plane rebuild process can introduce delay but will complete before the remote end to clears the tunnel due to timeout of control-plane messages. Referring to step 516, VePDG 104 ensures control plane and data-plane consistency and transitions to Active.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method for separately managing control and data context for a secure connection comprising:
   receiving, by a second node, information regarding an active secure connection, wherein the active secure connection is routed through a first node and comprises a secure control plane connection based on control plane parameters associated with the active secure connection and a secure data plane connection based on data plane parameters associated with the active secure connection, wherein the information includes at least the data plane parameters, wherein the secure control plane connection and the secure data plane connection are decoupled in accordance with a split architecture;

programming, by the second node, a standby secure data plane connection using the data plane parameters such that a data plane of the second node is in an active state while the first node is active, wherein a control plane of the second node is in a standby state while the first node is active; and in response to a determination that the first node is inactive:

routing, by the second node, data plane traffic associated with the active secure connection through the standby secure data plane connection;

transitioning the control plane of the second node to a state recovery state;

retrieving, by the second node, the control plane parameters from an external database that is accessible to the first node and the second node, the control plane parameters being stored in the external database by the first node;

programming, by the second node, a new control plane connection based on the retrieved control plane parameters; and routing, by the second node, control plane traffic associated with the active secure connection through the new control plane connection after the control plane of the second node has transitioned from the state recovery state to the active state.

2. The method of claim 1, wherein the determination is made by the second node in response to receiving data traffic associated with the active secure connection.

3. The method of claim 1, where the determination is made by the second node in response to receiving a notification that the first node is inactive.

4. The method of claim 1, wherein the active secure connection comprises an Internet Protocol Security (IPSec) connection.

5. The method of claim 1, wherein the first and second nodes comprise virtual Evolved Packet Data Gateways, System Architecture Evolution (SAE) Gateways, Packet Data Network ("PDN") Gateways, Global Data Synchronization Network (GDSN), or N3IWF nodes.

6. The method of claim 1, wherein the control plane parameters comprise at least one of:
an IP address;
an identifier for the active secure connection;
an identifier for an authentication algorithm associated with the secure control plane connection;
an identifier for an encryption algorithm associated with the secure control plane connection;
at least one authentication key associated with the secure control plane connection; or
at least one encryption key associated with the secure control plane connection.

7. The method of claim 1, wherein the data plane parameters comprise at least one of:
an IP address;
an identifier for the active secure connection;
an identifier for an authentication algorithm associated with the secure control plane connection;
an identifier for an encryption algorithm associated with the secure control plane connection;
at least one authentication key associated with the secure control plane connection; or
at least one encryption key associated with the secure control plane connection.

8. The method of claim 1, wherein the active secure connection comprises a connection between a user and the first node.

9. The method of claim 1, wherein the active secure connection comprises a connection between the first node and an IP based server.

10. A computer system for separately managing control and data context for a secure connection comprising:
a processor in the computer system;
a memory in communication with the processor, the memory including instructions configured to cause the processor to:
receive, at a second node, information regarding an active secure connection, wherein the active secure connection is routed through a first node and comprises a secure control plane connection based on control plane parameters associated with the active secure connection and a secure data plane connection based on data plane parameters associated with the active secure connection, wherein the information includes at least the data plane parameters, wherein the secure control plane connection and the secure data plane connection are decoupled in accordance with a split architecture;
program a standby secure data plane connection using the data plane parameters such that a data plane of the second node is in an active state while the first node is active, wherein a control plane of the second node is in a standby state while the first node is active; and
in response to a determination that the first node is inactive:
route data plane traffic associated with the active secure connection through the standby secure data plane connection;
transition the control plane of the second node to a state recovery state;
retrieve the control plane parameters from an external database that is accessible to the first node and the second node, the control plane parameters being stored in the external database by the first node;
program a new control plane connection based on the retrieved control plane parameters; and
route control plane traffic associated with the active secure connection through the new control plane connection after the control plane of the second node has transitioned from the state recovery state to the active state.

11. The system of claim 10, wherein the determination is made in response to receiving traffic associated with the secure connection.

12. The system of claim 10, where the determination is made in response to receiving a notification that the first node is inactive.

13. The system of claim 10, wherein the secure connection comprises an Internet Protocol Security (IPSec) connection.

14. The system of claim 10, wherein the first node and the second nodes comprise virtual Evolved Packet Data Gateways, System Architecture Evolution (SAE) Gateways, Packet Data Network ("PDN") Gateways, Global Data Synchronization Network (GDSN), or N3IWF nodes.

15. The system of claim 10, wherein the control plane parameters comprise at least one of:
an IP address;
an identifier for the active secure connection;

an identifier for an authentication algorithm associated with the secure control plane connection;

an identifier for an encryption algorithm associated with the secure control plane connection;

at least one authentication key associated with the secure control plane connection; or at least one encryption key associated with the secure control plane connection.

16. The system of claim 10, wherein the data plane parameters comprise at least one of:

an IP address;

an identifier for the active secure connection;

an identifier for an authentication algorithm associated with the secure control plane connection;

an identifier for an encryption algorithm associated with the secure control plane connection;

at least one authentication key associated with the secure control plane connection; or at least one encryption key associated with the secure control plane connection.

17. The system of claim 10, wherein the active secure connection comprises a connection between a user and the first node.

18. The system of claim 10, wherein the active secure connection comprises a connection between the first node and an IP based server.

* * * * *